United States Patent [19]

Eriksson et al.

[11] Patent Number: 4,610,893
[45] Date of Patent: Sep. 9, 1986

[54] METHOD OF MANUFACTURING AN ABSORBER PLATE FOR A BOILING WATER REACTOR

[75] Inventors: Sven Eriksson, Skultuna; Lars Hälldahl; Sven-Ake Kohrtz, both of Västerås, all of Sweden

[73] Assignee: Asea Aktiebolag, Västerås, Sweden

[21] Appl. No.: 683,463

[22] Filed: Dec. 19, 1984

[30] Foreign Application Priority Data

Dec. 20, 1983 [SE] Sweden .............................. 8307035

[51] Int. Cl.$^4$ .............................................. B05D 1/08
[52] U.S. Cl. .................................... 427/34; 250/518.1; 376/272; 376/327; 427/423
[58] Field of Search .................. 427/34, 423; 250/518; 376/272, 327, 333, 339

[56] References Cited

U.S. PATENT DOCUMENTS

| | | | |
|---|---|---|---|
| 3,859,533 | 1/1975 | Suvanto | 376/272 |
| 4,342,620 | 8/1982 | Viskrey | 376/272 |
| 4,366,115 | 12/1982 | Schlumpf | 376/272 |
| 4,400,347 | 8/1983 | Fredin et al. | |

FOREIGN PATENT DOCUMENTS 830032 12/1969 Canada ................................. 427/34

OTHER PUBLICATIONS

Riedel "Coatings of Boron Carbide Made by Plasma Method Used as a Shield for Absorption of Neutrons", Nuclear Research Institute, Warsaw, Poland, pp. 475–481 (1967), (Abstracted in *Chem. Abstracts*, vol. 68, No. 92198).

*Primary Examiner*—John H. Newsome
*Attorney, Agent, or Firm*—Watson, Cole, Grindle & Watson

[57] ABSTRACT

An absorber plate designed to be located in a gap between fuel rod bundles in the core of a boiling water reactor is manufactured by anchoring a burnable neutron-absorbing material to at least one sheet by spraying the absorbing material in finely-divided melted or plastically-formable state onto the sheet, to create a solidified layer of the absorbing material, and by enclosing the absorbing material, thus anchored, in a protective casing.

11 Claims, 3 Drawing Figures

METHOD OF MANUFACTURING AN ABSORBER PLATE FOR A BOILING WATER REACTOR

BACKGROUND OF THE INVENTION

1. Field of the Invention

This invention relates to a method of manufacturing a neutron absorber to be arranged in a gap between fuel rod bundles in a boiling water reactor core, which absorber comprises a protective casing, preferably of sheet metal, in which a neutron-absorbing material is enclosed.

2. Description of the Prior Art

An absorber of the kind refered to above is disclosed in U.S. Pat. No. 4,400,347. In this patent, the protective casing employed is made from sheets and is filled with a neutron-absorbing material, for example gadolinium oxide. The sheets are described as being of a zirconium alloy with a low neutron absorption.

Burnable neutron-absorbing material previously used in boiling water reactors has been included as a constituent in sintered pellets of uranium dioxide or other fuel. A large number of such pellets are then stacked on top of each other in a cladding tube.

SUMMARY OF THE INVENTION

The present invention is based on the realization that by spraying the absorbing material in finely-divided, melted or plastically-formable state onto at least one support sheet to create a solidified layer of the absorbing material, and by enclosing the absorbing material, thus anchored on its support sheet, in a protective casing, preferably of sheet metal, the advantage can be obtained that the absorbing material is efficiently anchored in the protective casing, so as to remain in the predetermined position during operation of the reactor, while at the same time the space requirement for the absorbing material can be reduced to a minimum, so that the absorber takes up the smallest possible space in the water gap and the water gap therefore can be utilized to the full. By fixing the absorbing material in the method described and because of the homogeneous structure of the absorbing material which is thus obtained by spraying, the absorbing material is prevented from moving, especially falling downwards, within its protective casing, as may be the case if the absorbing material consists of loose sintered bodies which are susceptable to cracking. Any displacement of the absorbing material after installation leads to an undesirable change of the nuclear geometry in the reactor core. Owing to the fact that the absorbing material is applied by a spraying of finely-divided moldable particles, all the exposed spaces, nooks and crannies on the support sheet used are available for coating with the absorbing material, which results in a maximum filling of the volume in the casing intended for the absorbing material, so that the volume can be made smaller. When using sintered bodies of the absorbing material, it is impossible to avoid gaps between the individual sintered bodies. In addition, an absorbing material applied according to the present invention will have a more homogeneous and compact structure, which in itself increases the possibility of reducing the volume needed to accommodate the absorbing material.

The absorbing material is preferably applied by flame spraying, but other thermal spraying techniques such as plasma spraying and arc spraying may be used, depending on the type of absorbing material being sprayed. It is important that the conditions during the spraying operation are such that, when contacting the surface of the supporting sheet, the absorbing material exists in a molten or plastically-formable state, so that it can conform to the surface on impact. The raw material fed to the spray means is preferably in a powdered state. At least the major part of the particles suitably have a size in the range 30–70 microns and preferably a size in the range 40-60 microns, in order to obtain a good homogeneous structure in the layer of the absorbing material. The maximum thickness of the layer of absorbing material between the inner walls of the protective casing of the absorber preferably lies between 0.10 and 0.40 mm. Thicknesses within the range 0.10 and 0.40 mm are chosen in each particular case, having regard to the operating conditions expected to occur in each particular case.

A preferred absorbing material is gadolinium oxide, $Gd_2O_3$, or gadolinium hydroxide, $Gd(OH)_3$, but other gadolinium compounds or metallic gadolinium as well as samarium, boron, europium, disprosium, indium and cadmium in elementary form and in the form of a chemical compound may be used. Prior to the application onto the support sheet, the absorbing material may be mixed with substances having a low neutron absorption, such as aluminum oxide or zirconium oxide. Such an intermixture may, for example, be used if it is desired that the sprayed-on layer should have an even thickness but should contain different amounts of neutron-absorbing material in different regions of the layer, for example for achieving a desired power distribution in the axial direction in a reactor core. To achieve this, mixtures of different contents of absorbing material and low neutron absorption substance are used when spraying different regions of the sheet.

BRIEF DESCRIPTION OF THE DRAWING

The invention will be described in greater detail, by way of example, with reference to the accompanying drawing, in which.

DESCRIPTION OF THE PREFERRED EMBODIMENTS

Figure 1:
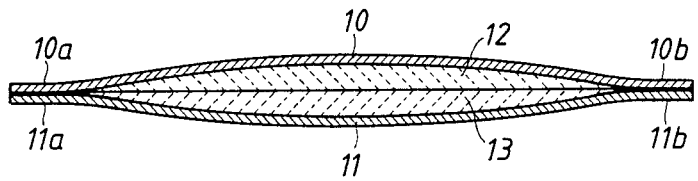
FIGS. 1 and 2 show in cross-section first and second embodiments of neutron-absorber plate manufactured according to the method of the present invention.

According to FIG. 1, each of two Zircaloy sheets, 10 and 11 (e.g. with a thickness of 0.4 mm, a width of 30 mm and a length of 4 m) is cleaned carefully and particle blasted on that side which is to be coated with absorber material so that grease and oxides are removed. The blasted side of each sheet is coated with gadolinium oxide by means of flame spraying in an atmosphere of acetylene gas and oxygen gas. A major part of the gadolinium oxide powder has grain sizes in the range 40–60 microns. The particles are fed through the flame so that they are in a melted or plastically-formable state when they impact on the sheet surface. To counteract bending of the sheets, each is cooled on its reverse side during spraying, for example by contacting the reverse side with a water-cooled copper plate. During the spraying, a layer of gadolinium oxide 12 and 13 of varying thickness is applied onto each sheet by appropriately varying the dwell time of the flame sprayer over different parts of the respective sheet. On each sheet the deposited layer is thickest at the middle (e.g. of 0.18 mm) and successively decreases towards each longitudinal edge. During the spraying operation the edges 10a, 10b and 11a, 11b around each sheet are masked so that they are not coated with the deposited absorber material. Following spraying, the two sheets are put together with the gadolinium layers facing each other and are then welded along all edges so that the absorber material 12, 13 is entirely enclosed within the casing formed by the sheets, in the finished absorber plate.

Figure 2:
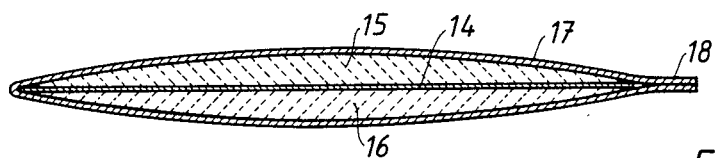

In the embodiment shown in FIG. 2, a cleaned and blasted sheet 14 of Zircaloy (e.g. having a thickness of 0.4 mm, a width of 30 mm and a length of 4 m), is coated on both sides with layers 15 and 16 of gadolinium oxide by means of flame spraying in the same manner as described with reference to the embodiment according to FIG. 1. The layer on each side of the sheet 14 has, over its entire length, a maximum thickness in the middle (e.g. of 0.18 mm), which successively decreases towards each longitudinal edge. The sheet 14 with the tapering coatings 15 and 16 is thereafter entirely enclosed in a casing 17 of Zircaloy sheet, which may be very thin, for example less than 0.1 mm. The casing 17 is folded around the sheet 14 and the sealing thereof can be effected by welding the edges of the two sides together to form a longitudinal joint 18 and two joints (not shown) extending transversely thereto, one at each end of the folded sheet.

Instead of using flame spraying to deposit the neutron-absorbing material, the gadolinium oxide may, in the exemplified case, be applied by plasma spraying in an argon atmosphere or in an atmosphere of helium, or in mixed atmospheres of nitrogen gas and argon, of hydrogen and argon or of nitrogen gas and hydrogen gas.

Figure 3:
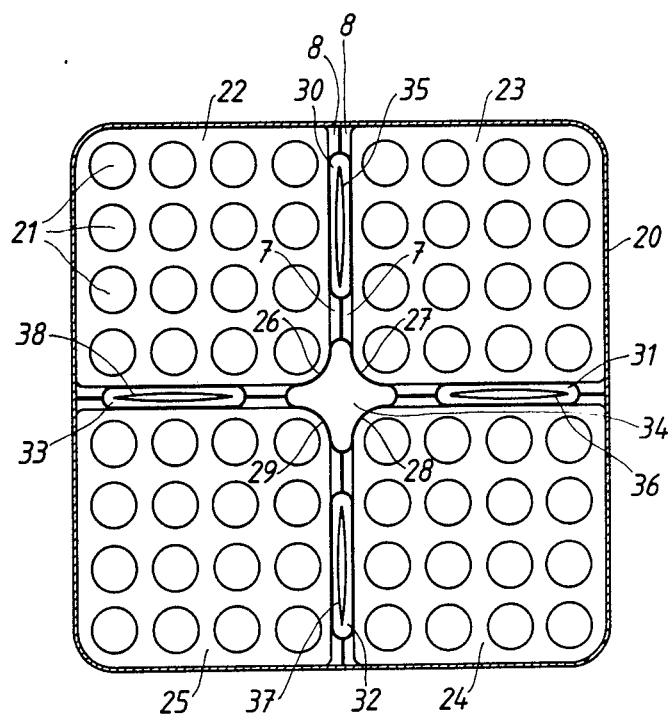
FIG. 3 shows a horizontal cross-section through a fuel assembly from the core of a nuclear reactor with absorber plates according to the present invention arranged in gaps between partial assemblies of the fuel rods included in the fuel assembly.

FIG. 3 shows a fuel asesembly for a reactor core of a boiling water reactor with a casing 20 of Zircaloy which surrounds sixty-four fuel rods (not shown) with their cladding tubes 21. The fuel rods are evenly distributed among four partial assemblies 22, 23, 24 and 25, which are each surrounded by a partial casing 26, 27, 28 and 29. The partial casings have been formed by dividing the fuel assembly, along a height of the same length as the fuel rods, into four parts, each part consisting of an elongated sheet element of Zircaloy with a generally L-shaped cross-section. Each sheet element has a number of connection pieces 7 and 8 and in the completed fuel assembly, the connection pieces 7 and 8 confront one another to thus form four longitudinal channels or gaps 30, 31, 32 and 33 between the adjacent partial casings. The sheet elements are welded to each other at the locations of the confronting connection pieces 7 and 8 on each element and to the casing at the points where longitudinal edges of the sheet elements make contact with the casing 20 of the fuel assembly. At the mid-point of the fuel assembly, the sheet elements are formed so as to create a central through-going channel 34. The fuel assembly is provided with top tie and bottom tie plates (not shown). During operation of the reactor core, water acting as coolant flows through the partial casings 26-29 and past the fuel rods 21 in the longitudinal direction of the fuel assembly, and water acting as a neutron moderator flows through the longitudinal channels 30-34 in the longitudinal direction of the fuel assembly. In the gaps 30-33 are disposed respective absorber plates 35, 36, 37 and 38 of the kind described in FIG. 1 or FIG. 2. When the burnable material is consumed, the absorber plates can be removed from the gaps 30-33 without the fuel assembly, or its partial bundles 22-25 having to be lifted from the core. This is an important advantage because it makes it possible to eliminate from the core the power generated by the decay of isotopes of gadolinium which have a low absorption cross-section for neutrons and which have been formed in the absorber plate. Another important advantage which follows from adoption of the method of the present invention is that if the improved absorber plates that result therefrom are used, the amount of burnable absorbing material in pellet form in the cladding tubes 21 can be greatly reduced, which means, in turn, that the amount of fissile material in the pellets can be considerably increased. The partial casings 26-29, as well as the gaps 30-33, typically have a length of 4 m, each gap 30-33 has a width of 33 mm and a thickness of 3 mm.

The Zircaloy material used for the support sheets and the protective casing, described above consists of 1.2 to 1.7 percent by weight of Sn, 0.07 to 0.24 percent by weight of Fe, 0.05 to 0.15 percent by weight of chromium, 0 to 0.08 percent by weight of Ni, 0.09 to 0.16 percent by weight of 0, the balance being Zr and impurities normally occurring in reactor grade Zr. In place of this material, other zirconium-based alloys, as well as other metallic materials with a low neutron absorption may be used for the sheet elements in an absorber made in accordance with the method of the invention.

It will be appreciated that other changes may be made to details of the embodiments described with reference to the drawing, without departing from the scope of the invention as defined in the following claims.

What is claimed is:

1. A method of manufacturing a neutron absorber which can be located in a gap between fuel rod bundles in a boiling water reactor core and which includes a neutron-absorbing material that is enclosed within a protective casing, said method comprising the steps of (1) providing a first elongated supporting sheet which has opposite sides and opposite longitudinal edges, each of said opposite sides having a longitudinal middle portion, (2) spraying a neutron-absorbing material onto at least one of said opposite sides of said first supporting sheet such that said neutron-absorbing material forms a solidified layer anchored on the associated side of said first supporting sheet, said spraying being conducted such that the thickness of each said layer of neutron-absorbing material is at a maximum at the longitudinal middle portion of the associated side of said first supporting sheet and successively decreases towards each opposite longitudinal edge thereof, and (3) applying a protective casing over each layer of solidified neutron-absorbing material on said first supporting sheet so as to encase each said layer.

2. A method according to claim 1, wherein in step (2) a neutron-absorbing layer is sprayed onto only one side of said first elongated support sheet, and wherein in step (3) a second elongated support sheet having a neutron-absorbing layer on one side thereof is attached to the longitudinal edges of said first elongated support sheet such that the neutron-absorbing layer on said second support sheet faces said neutron-absorbing layer on said first support sheet.

3. A method according to claim 1, wherein in step (2) neutron-absorbing layers are sprayed onto each of said opposite sides of said first support sheet, and wherein in step (3) a metal sheet is bent around said first support sheet to enclose the neutron-absorbing layers on each side thereof.

4. A method according to claim 3, wherein in step (2) particles of said neutron-absorbing material are plasma sprayed onto said opposite sides of said first support sheet.

5. A method according to claim 3, wherein in step (2) particles of said neutron-absorbing material are flame sprayed onto said opposite sides of said first support sheet.

6. A method according to claim 2, wherein in step (2) particles of said neutron-absorbing material are plasma sprayed onto said one side of said first support sheet.

7. A method according to claim 2, wherein in step (2) particles of said neutron-absorbing material are flame sprayed onto said one side of said first support sheet.

8. A method according to claim 1, wherein in step (2) particles of said neutron-absorbing material having sizes of between 30 and 70 microns are sprayed onto at least one of said opposite sides of said first support sheet.

9. A method according to claim 8, wherein said particles of said neutron-absorbing material are elements selected from the group consisting of gadolinium, samarium, boron, europium, disprosium, indium and cadium.

10. A method according to claim 8, wherein said particles of said neutron-absorbing material are compounds which include elements selected from the group consisting of gadolinium, samarium, boron, europium, disprosium, indium and cadium.

11. A method according to claim 1, wherein the maximum thickness of said layer of neutron-absorbing material at the longitudinal middle portion of the associated side of said first support sheet is 0.10 to 0.40 mm.

* * * * *